(12) United States Patent
Yoshida et al.

(10) Patent No.: US 10,364,689 B2
(45) Date of Patent: Jul. 30, 2019

(54) EXPANSION TURBINE AND TURBOCHARGER (71) Applicant: MITSUBISHI HEAVY INDUSTRIES ENGINE & TURBOCHARGER, LTD., Sagamihara-shi, Kanagawa (JP)

(72) Inventors: Toyotaka Yoshida, Tokyo (JP); Takao Yokoyama, Tokyo (JP); Yosuke Danmoto, Tokyo (JP); Youji Akiyama, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/314,688

(22) PCT Filed: Aug. 28, 2014

(86) PCT No.: PCT/JP2014/072571
§ 371 (c)(1),
(2) Date: Nov. 29, 2016

(87) PCT Pub. No.: WO2016/031017
PCT Pub. Date: Mar. 3, 2016

(65) Prior Publication Data
US 2017/0198593 A1 Jul. 13, 2017

(51) Int. Cl.
*F01D 9/02* (2006.01)
*F01D 25/24* (2006.01)
(Continued)

(52) U.S. Cl.
CPC .............. *F01D 9/026* (2013.01); *F01D 25/24* (2013.01); *F02B 37/00* (2013.01); *F02B 39/00* (2013.01);
(Continued)

(58) Field of Classification Search
CPC .......... F01D 9/026; F01D 25/24; F02B 37/22; F02B 37/24; F05D 2240/12
See application file for complete search history.

(56) References Cited

U.S. PATENT DOCUMENTS

| | | | |
|---|---|---|---|
| 2007/0089414 A1 | 4/2007 | Yokoyama et al. |
| 2011/0076139 A1 | 3/2011 | Brown |
| 2012/0111002 A1 | 5/2012 | Tabata |

FOREIGN PATENT DOCUMENTS

| | | |
|---|---|---|
| CN | 1952361 A | 4/2007 |
| CN | 102472298 A | 5/2012 |

(Continued)

OTHER PUBLICATIONS

H. Tamaki et al., "Study on Flow Fields in Variable Area Nozzles for Radial Turbines", IHI Technical Review, vol. 47, No. 1, (Mar. 2007).

(Continued)

*Primary Examiner* — Ngoc T Nguyen
(74) *Attorney, Agent, or Firm* — Birch, Stewart, Kolasch & Birch, LLP (57) ABSTRACT

An expansion turbine including a turbine housing, a plurality of variable nozzles inside the turbine housing at intervals in a circumferential direction of the expansion turbine, the variable nozzles being configured to be rotatable about a rotation shaft, and a turbine wheel disposed rotatably inside the turbine housing, the turbine wheel including a plurality of turbine blades disposed downstream of the variable nozzles. The turbine housing has a first wall surface which faces tips of the turbine blades, and a second wall surface which faces the first wall surface across a flow path of the working fluid. A blade height of the variable nozzles at an outlet side is greater than a blade height of the turbine blades at an inlet side.

8 Claims, 6 Drawing Sheets (51) Int. Cl.
  *F02B 39/00* (2006.01)
  *F02B 37/00* (2006.01)
  *F04D 25/04* (2006.01)

(52) U.S. Cl.
  CPC .......... *F04D 25/04* (2013.01); *F05D 2240/12* (2013.01); *Y02T 10/144* (2013.01)

(56) References Cited

FOREIGN PATENT DOCUMENTS

| | | |
|---|---|---|
| JP | 60-65207 A | 4/1985 |
| JP | 60-153403 A | 8/1985 |
| JP | 62-101038 U | 6/1987 |
| JP | 62-152034 U | 6/1987 |
| JP | 2003-120303 A | 4/2003 |
| JP | 2011-149306 A | 8/2011 |
| JP | 2012-2140 A | 1/2012 |
| JP | 2012002140 A * | 1/2012 |

OTHER PUBLICATIONS

T. Inoue et al., "Development of VGS Unit (STEP4) for RHV4 Turbocharger", IHI Technical Review, vol. 51, No. 3, (Sep. 2011).
Y. Jinnai et al., "A Variable Geometry (VG) Turbocharger for Passenger Cars to Meet European Union Emission Regulations", MHI Technical Review, vol. 49, No. 2, (Jun. 2012).
Office Action dated Jun. 9, 2017 issued in the corresponding JP Application No. 2016-545164 with an English Translation.
An International Search Report (Forms PCT/ISA/210, PCT/ISA/220), dated Nov. 25, 2014, for International Application No. PCT/JP2014/072571.
International Preliminary Report on Patentability and Written Opinion of the International Searching Authority (Forms PCT/IB/326, PCT/IB/338, PCT/IB/373, PCT/ISA/237) dated Mar. 9, 2017, for International Application No. PCT/JP2014/072571, with an English translation.
Office Action dated Nov. 1, 2017 issued in the corresponding Chinese Application No. 201480079723.3 with an English Translation.
Decision of Refusal dated Sep. 1, 2017, issued to the corresponding JP Application No. 2016-545164 with a machine English Translation.
Extended European Search Report dated May 11, 2017 issued to the corresponding EP Application No. 14900922.7.
Office Action dated May 17, 2018 issued to the corresponding CN Application No. 201480079723.3 with a Machine Translation.
The Report of Reconsideration by Examiner before Appeal dated Jan. 5, 2018, issued to the corresponding Japanese Application No. 2016-545164 with an English Translation.
Office Action dated Jul. 12, 2018 issued to the corresponding EP Application No. 14 900 922.7.

* cited by examiner

EXPANSION TURBINE AND TURBOCHARGER

TECHNICAL FIELD

The present disclosure relates to an expansion turbine provided with variable nozzles, and a turbocharger including the expansion turbine.

BACKGROUND ART

In recent years, there is a remarkable trend to provide an internal combustion engine for an automobile with a turbocharger to improve fuel consumption. Among several types of turbochargers is a variable geometry turbocharger including variable nozzles disposed on the inlet side of an expansion turbine, whereby a flow rate of a working fluid is adjustable by changing the opening degree of the variable nozzles. Thus, the variable geometry turbocharger can be operated in accordance with a change in the loads of an internal combustion engine, and a response performance is particularly high during low-load operation.

Figure 8:
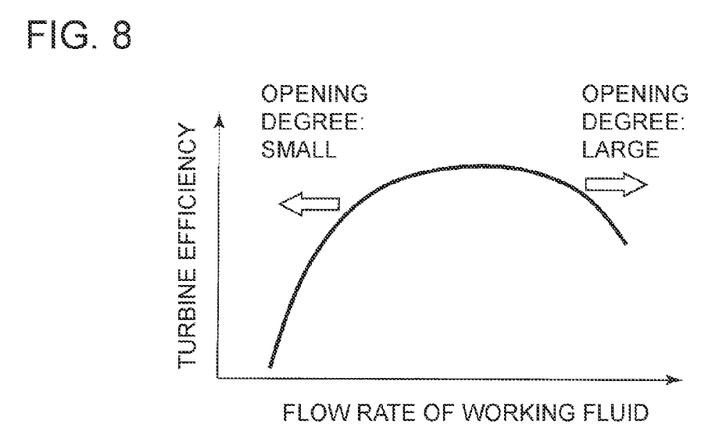
FIG. 8 is a chart showing a relationship between a flow rate of a working fluid and a turbine efficiency of an expansion turbine.

However, as depicted in FIG. 8, a variable geometry turbocharger is characterized in that, when the opening degree of the variable nozzles is small, the turbine efficiency considerably decreases from a peak point (where the nozzle opening degree is near the intermediate opening-degree range). The turbine efficiency during the time when the nozzle opening degree is in the small opening-degree range affects the response performance considerably. Thus, it is desirable to improve the turbine efficiency in the small opening-degree range.

To improve the turbine efficiency in the small opening-degree range, it is advantageous to reduce the incidence angle of the variable nozzles (an incidence angle is a difference between an inflow angle of a working fluid flowing into the variable nozzles and a leading-edge blade angle of the variable nozzles). Thus, to reduce the incidence angle, one may narrow a scroll section (that is, reduce the size of the scroll section) of a turbine housing in accordance with the leading-edge blade angle of the variable nozzles in the small opening-degree range.

On the other hand, narrowing the scroll section leads to an increase in the incidence angle during the time when the nozzle opening degree is in the large opening-degree range, which may raise a risk of flow separation on the blade surfaces of the variable nozzles, a decrease in the actual flow-path area, and reduction in the flow rate of the working fluid (maximum flow rate).

As described above, it is not easy to achieve both an improved turbine efficiency in the small opening-degree range of the variable nozzles and a sufficient maximum flow rate in the large opening-degree range of the variable nozzles, by simply adjusting the shape of the scroll section of the turbine housing. It is thus desirable to make use of techniques other than modification of the shape of the scroll section to satisfy the above two requirements.

Although not intended to achieve both an improved turbine efficiency in the small opening-degree range of the variable nozzles and a sufficient maximum flow rate in the large opening-degree range, Patent Document 1 discloses a turbine including an annular guide portion (guide surface) formed on an inlet side of turbine blades on a wall surface of a shroud of a turbine housing facing tips of the turbine blades, the guide portion being inclined toward the back-surface side of a turbine wheel in the radial direction of the turbine.

With the turbine disclosed in Patent Document 1, a working fluid flowing into the turbine blades is attracted to the back-surface side of the turbine wheel by formation of the guide portion, which suppresses an exciting force generated by wake of the variable nozzles acting in the vicinity of the tips of the turbine blades, and thereby suppresses vibration of the turbine blades. Furthermore, a gap between the turbine blades and the wall surface of the shroud is blocked by the guide portion, and thereby a clearance flow via the gap is suppressed.

CITATION LIST

Patent Literature

Patent Document 1: JP2012-002140A

SUMMARY

Problems to be Solved

However, in the turbine disclosed in Patent Document 1, the guide portion protrudes considerably toward a hub to reduce a clearance flow via a gap between the turbine blades and the wall surface of the shroud. Thus, the front end of the inlet of the turbine blades is partially covered by the tip of the guide portion, and the narrowest section of the flow path is positioned upstream of the inlet of the turbine blades. The working fluid does not flow into a part of the leading edges of the turbine blades due to the contraction-flow effect, which causes the turbine blades to fail to exert the predetermined performance, thus reducing the turbine efficiency.

In view of the above problems of typical techniques, an object of at least one embodiment of the present invention is to provide an expansion turbine and a turbocharger whereby it is possible to suppress a decrease in the turbine efficiency when variable nozzles are in the small opening-degree range, to ensure a flow rate of a working fluid when the variable nozzles are in the large opening-degree range, and to draw out the predetermined performance of turbine blades to suppress a decrease in the turbine efficiency.

Solution to the Problems (1) An expansion turbine for recovering power from energy of a working fluid, according to at least one embodiment of the present invention, comprises: a turbine housing including a scroll section for taking in the working fluid; a plurality of variable nozzles disposed inside the turbine housing at intervals in a circumferential direction of the expansion turbine, each of the variable nozzles being configured to be rotatable about a rotation shaft so as to change an area of a flow path of the working fluid flowing from the scroll section; and a turbine wheel disposed rotatably inside the turbine housing, the turbine wheel including a plurality of turbine blades disposed downstream of the variable nozzles. The turbine housing has a first wall surface including a shroud section which faces tips of the turbine blades, and a second wall surface which faces the first wall surface across the flow path of the working fluid. A blade height of the variable nozzles at an outlet side is greater than a blade height of the turbine blades at an inlet side. The shroud section has a protruding portion protruding toward the second wall surface so as to reduce a height of the flow path of the working fluid toward downstream, at a downstream side of an outlet of the variable nozzles and an upstream side of an inlet of the turbine blades. A protruding amount of the protruding portion is set so that a tip end of the protruding portion does not protrude toward the second wall surface past the tips of the turbine blades at the inlet.

With the above configuration (1), the blade height of the variable nozzles at the outlet side is greater than the blade height of the turbine blades at the inlet side, which makes it possible to increase the throat area of the flow path of the working fluid formed between the variable nozzles. Thus, it is possible to ensure a sufficient flow rate (maximum flow rate) of the working fluid that flows into the turbine blades when the variable nozzles are in the large opening-degree range.

Furthermore, when the variable nozzles are in a small opening-degree range, the working fluid flowing into the turbine blades has a strong swirling component due to the small nozzle opening degree, but has a small flow-velocity component directed inward in the radial direction. Thus, in a typical expansion turbine, in the small opening-degree range of the variable nozzles, the working fluid is likely to be attracted toward the shroud (the first wall surface), due to a centrifugal force generated by the swirling component of the working fluid flowing into the turbine blades. Accordingly, if the working fluid is attracted toward the shroud wall surface, the flow of the working fluid gets closer to the side of the shroud, thus the flow velocity being higher by the side of the shroud and lower by the side of the hub (the second wall surface), at the outlet of the turbine blades. As a result, the working fluid spreads out at the downstream side of the turbine blades so as to cancel the unevenness in the flow velocity, which is likely to cause a mixing loss.

In this regard, with the above configuration (1), the shroud section has the protruding portion, and thus the working fluid flows along the protruding portion to be attracted toward the second wall surface (the hub), and a drift of the working fluid toward the first wall surface (the shroud) is suppressed. Thus, an unbalanced flow at the outlet of the turbine blades is mitigated and a mixing loss is reduced, which improves the turbine efficiency.

Accordingly, with the above configuration (1), in addition to the above described merit of ensuring the maximum flow rate in the large opening-degree range of the variable nozzles, it is possible to achieve a merit of improving the turbine efficiency in the small opening-degree range of the variable nozzles.

Furthermore, with the above configuration (1), the protruding amount of the protruding portion is set so that the tip end of the protruding portion does not protrude toward the second wall surface over the tips of the turbine blades at the inlet, and thus the working fluid flows into a broader range in the height direction of the turbine blades, which makes it possible to suppress a decrease in an effective flow-path area at the inlet of the turbine blades due to the contraction-flow effect of the protruding portion. Thus, a predetermined performance of the turbine blades can be more easily achieved, and it is possible to maintain a high turbine efficiency.

(2) In some embodiments, in the above configuration (1), the expansion turbine comprises a radial turbine configured such that the working fluid flows into the inlet of the turbine blades along a radial direction of the expansion turbine. An axial position $X_p$ of the tip end of the protruding portion satisfies a relationship $0 < X_t \leq X_p$, where an origin is an axial position of roots of the turbine blades at the inlet and $X_t$ is an axial position of the tips of the turbine blades at the inlet of the turbine blades.

With the above configuration (2), in the radial turbine, the protruding amount of the protruding portion is set so that the tip end of the protruding portion does not protrude toward the hub of the turbine blades. Thus, it is possible to suppress a decrease in a flow-path area at the inlet of the turbine blades and a predetermined performance of the turbine blades can be more easily achieved, which makes it possible to maintain a high turbine efficiency.

(3) In some embodiments, in the above configuration (2), the first wall surface has a tapered surface extending diagonally with respect to the radial direction and forming the protruding portion. An angle formed between the tapered surface and an axial direction of the expansion turbine is not greater than 40 degrees.

With the above configuration (3), it is possible to attract the working fluid toward the second wall surface (the hub) sufficiently along the tapered surface at the upstream side of the inlet of the turbine blades, and thus it is possible to suppress a drift of the working fluid toward the first wall surface (the shroud). Accordingly, a flow-velocity distribution becomes uniform at the outlet of the turbine blades, and a mixing loss is suppressed, which improves the turbine efficiency.

(4) In some embodiments, in the above configuration (2) or (3), a relationship $R_S/R_R \geq 1.4$ is satisfied, where Rs is a distance in the radial direction between a center axis of the expansion turbine and the rotation shaft of the variable nozzle, and $R_R$ is a distance in the radial direction between the center axis of the expansion turbine and the inlet of the turbine blades.

With the above configuration (4), the distance between the outlet of the variable nozzles and the inlet of the turbine blades increases, which leads to a decrease in the flow velocity of the working fluid at the outlet side of the variable nozzles, thus making it possible to suppress a decrease in the static pressure. Thus, it is possible to reduce a pressure differential between the pressure surface and the suction surface of each variable nozzle, which makes it possible to suppress a clearance flow and to improve the turbine efficiency.

Particularly in the small opening-degree range, a loss due to a clearance flow has a high proportion in the total flow loss, and thus the effect of the above configuration (4) is more significant (suppression of a clearance flow has a strong effect to improve the turbine efficiency).

(5) In some embodiments, in any one of the above configurations (1) to (4), a turbocharger comprises: the expansion turbine according to any one of claims 1 to 6, configured to be driven by exhaust gas from an internal combustion engine; and a compressor configured to be driven by the expansion turbine to compress intake air to the internal combustion engine.

With the above configuration (5), in the turbocharger, it is possible to suppress a decrease in the turbine efficiency when the variable nozzles are in the small opening-degree range, and to ensure a flow rate of a working fluid when the variable nozzles are in the large opening-degree range. Furthermore, a predetermined performance of the turbine blade can be more easily achieved, and it is possible to maintain a high turbine efficiency.

Advantageous Effects

According to at least one embodiment of the present invention, it is possible to suppress a decrease in the turbine efficiency when the variable nozzles are in the small opening-degree range, to ensure a flow rate of a working fluid when the variable nozzles are in the large opening-degree range, and to reduce a decrease in the performance of the turbine blades to suppress a decrease in the turbine efficiency.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

A turbocharger, an example of application of the present invention, will now be described. A turbocharger, an example of application of the present invention, is not particularly limited and only needs to be a supercharger for forcedly sending intake air into an internal combustion engine. For instance, the turbocharger may be a turbocharger for an automobile, or a turbocharger for a ship.

Figure 1:
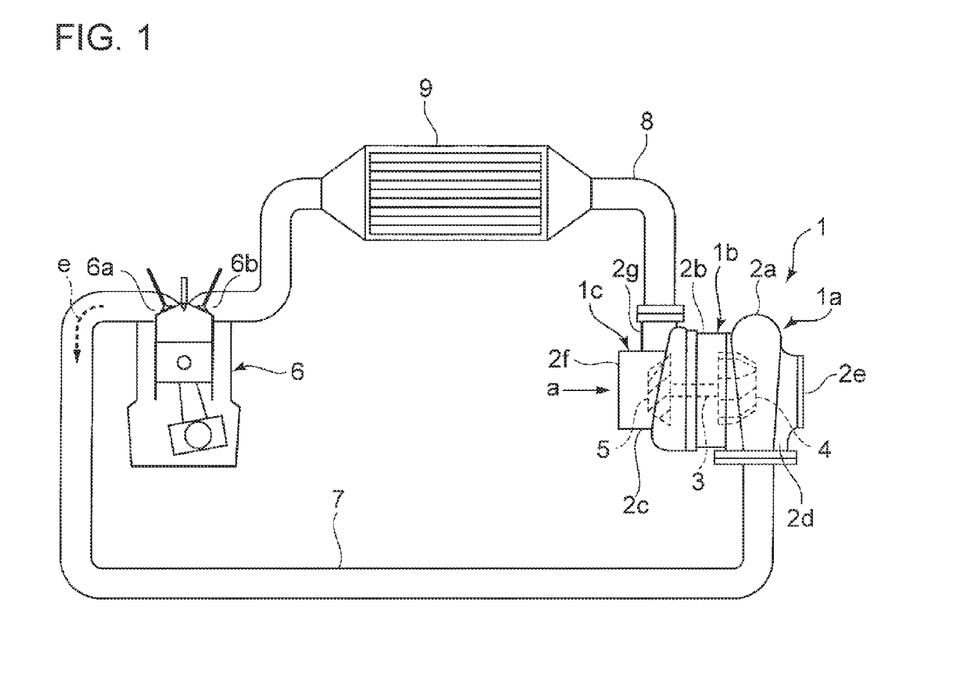
FIG. 1 is an overall configuration diagram of a turbocharger according to an embodiment of the present invention.
Figure 2:
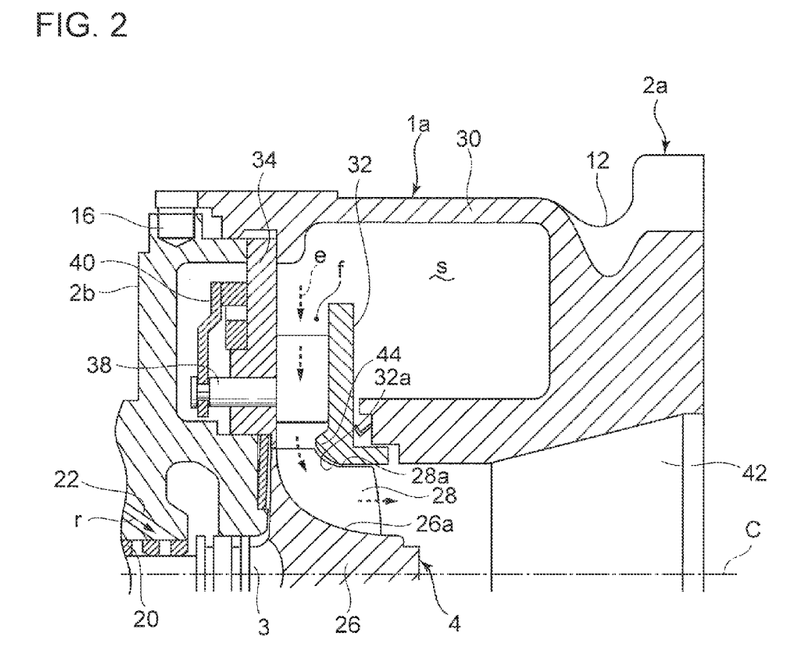
FIG. 2 is a vertical cross-sectional view of an exhaust turbine of a turbocharger according to an embodiment of the present invention.

FIG. 1 is an overall configuration diagram of a turbocharger according to an embodiment. FIG. 2 is a detailed cross-sectional view of a structure of an exhaust turbine of a turbocharger according to an embodiment.

The turbocharger 1 depicted in FIG. 1 is a turbocharger for an automobile, and is mounted to an automobile engine 6. The turbocharger 1 includes an exhaust turbine 1a, a bearing mount 1b, and a compressor 1c. The exhaust turbine 1a includes an expansion turbine 10A or an expansion turbine 10B described below in detail. The exhaust turbine 1a has a turbine housing 2a, the bearing mount 1b has a bearing housing 2b, and the compressor 1c has a compressor housing 2c.

A center shaft 3 is disposed along the axial direction of the turbocharger 1 inside the above housings, and supported rotatably by a bearing (not depicted). A turbine wheel 4 is fixed to an end of the center shaft 3 disposed on the side of the turbine housing 2a, while a compressor wheel 5 is fixed to the other end of the center shaft 3 disposed on the side of the compressor housing 2c.

An exhaust pipe 7 is connected to an exhaust port 6a of the automobile engine 6 at one end, and to an inlet casing 2d of the turbine housing 2a at the other end. An intake pipe 8 is connected to an outlet casing 2g of the compressor housing 2c at one end, and to an intake port 6b of the automobile engine 6 at the other end.

Exhaust gas "e" discharged from the exhaust port 6a flows into a scroll section of the turbine housing 2a as a working fluid in the tangent direction via the exhaust pipe 7, rotates the turbine wheel 4, and exits through an outlet opening 2e.

Rotation of the turbine wheel 4 is transmitted to the compressor wheel 5 via the center shaft 3, and rotation of the compressor wheel 5 takes in air "a" through an inlet opening 2f of the compressor housing 2c. Air "a" taken in through the inlet opening 2f is compressed by the compressor wheel 5, and is discharged from an outlet casing 2g of the compressor housing 2c to the intake pipe 8. High-pressure air discharged into the intake pipe 8 is cooled by an inter-cooler 9, and is supplied to a combustion chamber (not depicted) of the automobile engine 6 through the intake port 6b.

While the exhaust turbine (expansion turbine) 1a of the turbocharger 1 is driven by exhaust gas alone in the exemplary embodiment illustrated in FIG. 1, exhaust gas may be used as a main driving source and a motor may be employed as an auxiliary driving source, in another embodiment.

Furthermore, in the exemplary embodiment illustrated in FIG. 2, the turbine housing 2a and the bearing housing 2b of the exhaust turbine 1a are coupled with a coupling unit 16. The bearing 20 disposed in the bearing housing 2b to support the center shaft 3 rotatably is supplied with lubricant oil "r" through a lubricant oil passage 22. The compressor 2c (see FIG. 1) is disposed adjoining to the bearing housing 2b on the side opposite from the exhaust turbine 1a.

The turbine wheel 4 is fixed to the turbine-side end of the center shaft 3 disposed along the axial direction of the turbocharger 1 inside the housing. The turbine wheel 4 includes a hub 26 fixed to the center shaft 3, and a plurality of turbine blades 28 fixed in a radial fashion to an outer surface (hub surface 26a) of the hub 26 in the circumferential direction.

A scroll section 30 for taking in exhaust gas "e" as a working fluid is formed on the turbine housing 2a, and a space "s" of a scroll shape for taking in exhaust gas "e" is formed inside the scroll section 30. The turbine housing 2a includes an outer shell portion 12 defining a profile of the turbine housing 2a, a nozzle plate 32 disposed in the vicinity of a downstream end of the space "s", and a nozzle mount 34 disposed so as to face the nozzle plate 32.

A flow path "f" communicating with the space "s" is formed between the nozzle plate 32 and the nozzle mount 34. A plurality of variable nozzles 36 is disposed inside the flow path "f" in the circumferential direction of the center shaft 3 (the circumferential direction of the exhaust turbine 1a), and the variable nozzles 36 are disposed at intervals around the turbine blades 28.

A rotation shaft 38 is integrally joined to each of the variable nozzles 36, and the rotation shaft 38 of each variable nozzle 36 protrudes from a through hole formed on the nozzle mount 34 into a space formed on the back-surface side of the nozzle mount 34. On the back-surface side of the nozzle mount 34, each rotation shaft 38 is connected to an actuator (not depicted) disposed outside the bearing housing 2b via a synchronization mechanism 40 and a transmission shaft (not depicted).

The actuator is operated to rotate the plurality of variable nozzles 36 about the rotation shafts 38 in synchronization. The synchronized rotation of the variable nozzles 36 changes the flow-path area of the flow path "f" when the exhaust gas "e" from the space "s" passes through the flow path "f" to flow into the turbine blades 28.

A part of the nozzle plate 32 forms a shroud wall surface 32a covering tips 28a of the turbine blades 28. The wall surface of the nozzle plate 32 of the turbine housing 2a forms the first wall surface including a shroud wall surface 32a, and the wall surface of the nozzle mount 34 of the turbine housing 2a facing the nozzle plate 32 forms the second wall surface. The first wall surface and the second wall surface of the turbine housing 2a will be described later.

The flow path "f" is formed along a direction orthogonal to the axis C of the center shaft 3, that is, along the radial direction of the exhaust turbine 1a, and thereby the exhaust turbine 1a forms a radial turbine.

The exhaust gas "e" flowing into the space "s" of the scroll section 30 from the exhaust pipe 7 flows into the flow path "f" in the tangent direction. The exhaust gas "e" flowing into the flow path "f" reaches the turbine blades 28 to rotate the turbine wheel 4 and the center shaft 3, and then flows out through the outlet opening 42 formed on the axis C of the center shaft 3.

Described below are structures including variable nozzles and turbine blades of an expansion turbine which can be used as the exhaust turbine 1a.

Figure 3:
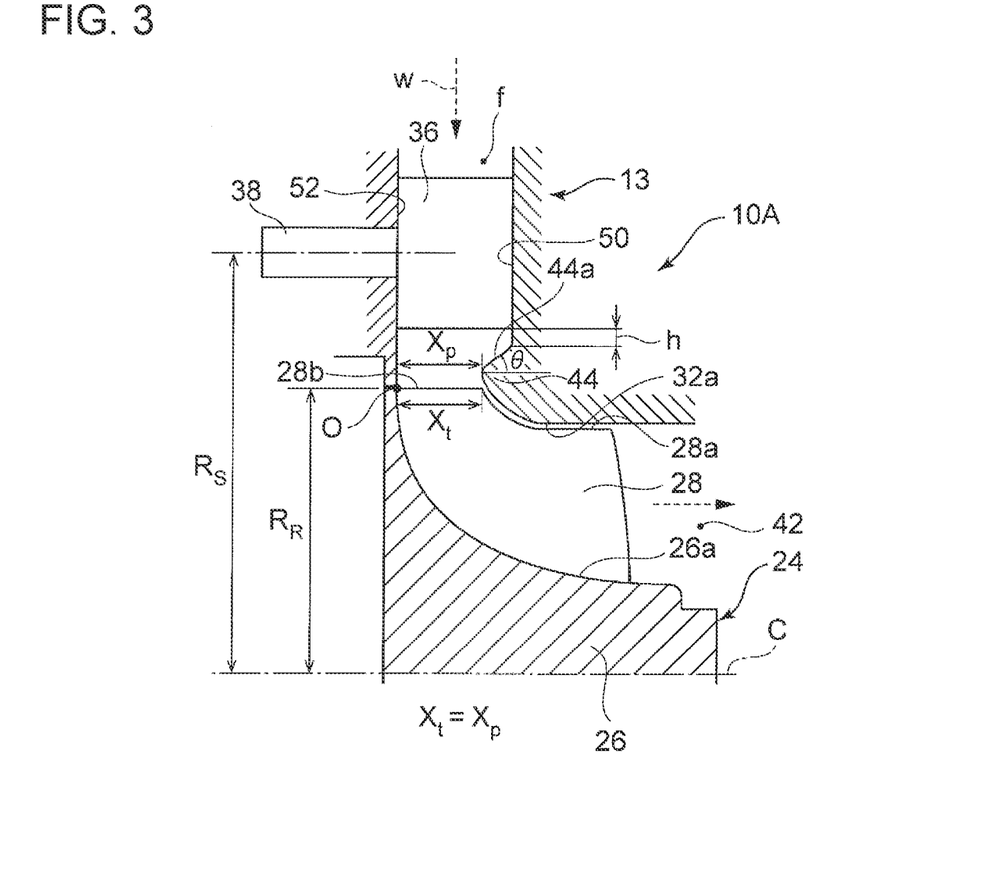
FIG. 3 is a cross-sectional view of a variable nozzle, a turbine blade, and their surrounding structure, of an expansion turbine according to an embodiment.
Figure 4:
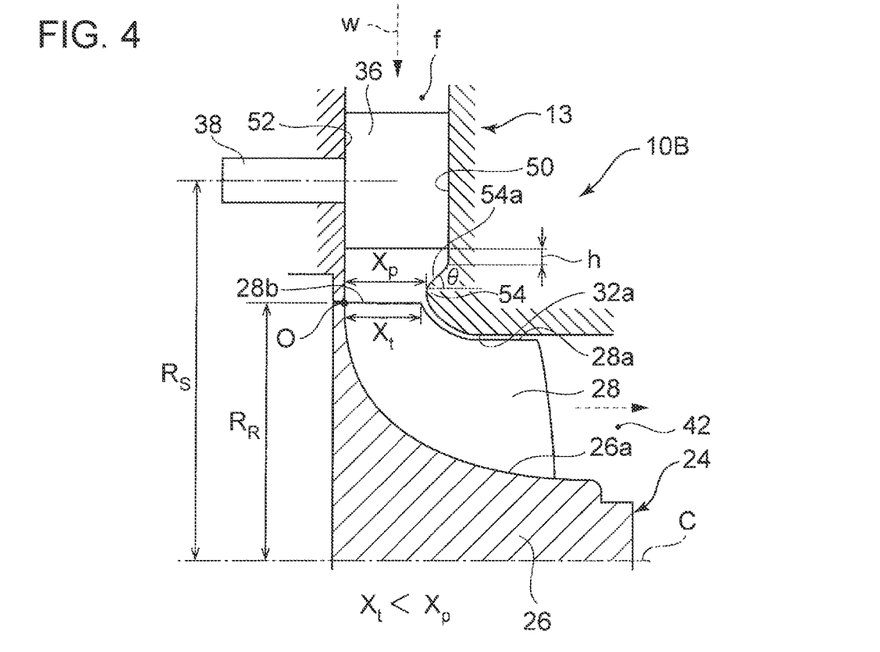
FIG. 4 is a cross-sectional view of a variable nozzle, a turbine blade, and their surrounding structure, of an expansion turbine according to an embodiment.

FIG. 3 is a cross-sectional view of a variable nozzle, a turbine blade, and their surrounding structure, of an expansion turbine according to an embodiment. FIG. 4 is a cross-sectional view of a variable nozzle, a turbine blade, and their surrounding structure, of an expansion turbine according to another embodiment.

In some embodiments, as depicted in FIGS. 3 and 4, a turbine housing 13 of the expansion turbine 10 (10A, 10B) includes a first wall surface 50 including a shroud section (shroud wall surface 32a) facing a tip 28a of the turbine blade 28, and a second wall surface 52 facing the first wall surface 50 across the flow path "f" of the working fluid "w". In the expansion turbine 10 (10A, 10B) depicted in FIGS. 3 and 4, the blade height of the variable nozzle 36 at the outlet is greater than the blade height of the turbine blade 28 at the inlet. Furthermore, a protruding portion 44, 54 protruding toward the second wall surface 52 is formed on the first wall surface 50 downstream the outlet of the variable nozzle 36 and upstream the inlet of the turbine blade 28 so that the flow-path height of the flow path "f" reduces downstream in the flow direction of the working fluid. In the exemplary embodiment depicted in FIGS. 3 and 4, the protruding portion 44, 54 has a tapered surface 44a, 54a inclined from the axial direction of the expansion turbine 10 (from the direction of the axis C) in a flat shape.

The protruding amount of the protruding portion 44, 54 is set so that the tip end of the protruding portion 44 does not protrude toward the second wall surface 52 over the tip 28a at the inlet (leading edge 28b) of the turbine blade 28. Specifically, where origin O is the axial position of the root of the turbine blade on the leading edge 28b of the turbine blade 28 (the intersection of the leading edge 28b and the hub surface 26a of the hub 26 of the turbine wheel 24), and $X_t$ is the axial position of the tip 28a on the leading edge 28b of the turbine blade 28, the axial position $X_p$ of the tip end of the protruding portion 44 satisfies a relationship $0 < X_t \leq X_p$.

In the exemplary embodiment illustrated in FIG. 3, the axial position $X_p$ of the tip end of the protruding portion 44 is the same as the axial position $X_t$ of the tip 28a on the leading edge 28b of the turbine blade 28 (i.e., a condition $X_p = X_t$ is satisfied). In the exemplary embodiment illustrated in FIG. 4, the axial position $X_p$ of the tip end of the protruding portion 44 is receded toward the shroud from the axial position $X_t$ of the tip 28a on the leading edge 28b of the turbine blade 28 (i.e., a condition $X_p > X_t$ is satisfied).

In some embodiments, the tapered surface 44a, 54a of the protruding portion 44, 54 is inclined from the axial direction by an angular degree of 40 degrees or less.

Furthermore, in some embodiments, as depicted in FIGS. 3 and 4, a ratio of the distance $R_S$ in the radial direction between the axis C and the axis of the rotation shaft 38 to the distance $R_R$ between the axis C and the inlet (leading edge 28b) of the turbine blade 28 satisfies a condition $1.4 \leq R_S/R_R$.

Furthermore, the shroud wall 32a upstream of the protruding portion 44, 54 has an expansion allowance "h" between the protruding portion 44, 54 (tapered surface 44a, 54a) and an outlet end of the variable nozzle 36 in the position of the maximum opening degree, so as to provide room for thermal expansion of the variable nozzle 36.

With this configuration, the working fluid "w" flowing into the flow path "f" from the space "s" has its flow rate adjusted by adjustment of the opening degree of the variable nozzle 36. As indicated by dotted lines in FIG. 5, a working fluid flowing through a region near the first wall surface 50 (shroud side) at the outlet of the variable nozzle 36 is attracted toward the second wall surface 52 when flowing along the outer surface (tapered surface 44a, 54a) of the protruding portion 44, 54. In this state, the working fluid flows through a flow path between the turbine blades 28 in a relatively uniform distribution in the blade-height direction of the turbine blades 28, rotates the turbine wheel 24, and exits through the outlet opening 42.

In the above embodiment, the tip end of the protruding portion 44, 54 is set so as not to protrude toward the second wall surface 52 past the tip 28a at the inlet of the turbine blade 28. Specifically, where origin O is the axial position of the root of the turbine blade on the leading edge 28b of the turbine blade 28 (the intersection of the leading edge 28b and the hub surface 26a of the hub 26 of the turbine wheel) and $X_t$ is the axial position of the tip 28a (position in the direction of axis C), the axial position $X_p$ of the tip end of the protruding portion 44, 54 satisfies a relationship $0 < X_t \leq X_p$, and thereby it is possible to suppress a decrease in the effective flow-path area at the inlet of the turbine blade 28 due to the contraction-flow effect of the protruding portion 44, 54. Thus, a predetermined performance of the turbine blades can be more easily achieved, and it is possible to maintain a high turbine efficiency.

Furthermore, since the tapered surface 44a, 54a forms an angle of 40 degrees or less with the axial direction, the working fluid "w" can be attracted sufficiently toward the second wall surface 52 (hub side) along the tapered surface 44a, 54a at the inlet of the turbine blade 28, which suppresses a drift of the working fluid "w" toward the first wall surface 50 (the shroud wall 32a). In this way, a flow-velocity distribution becomes uniform at the outlet of the turbine blade and a mixing loss is suppressed, which improves the turbine efficiency.

Furthermore, since a ratio of the distance $R_S$ in the radial direction between the axis C and the axis of the rotation shaft 38 to the distance $R_R$ between the axis C and the inlet tip surface 28b satisfies a condition $1.4 \leq R_S/R_R$, the distance between the outlet of the variable nozzle 36 and the inlet of the turbine blade 28 increases, which leads to a decrease in the flow velocity of the working fluid "w" at the outlet side of the variable nozzle, thus making it possible to suppress a decrease in the static pressure.

Thus, it is possible to reduce a pressure differential between the pressure surface and the suction surface of the variable nozzle 36, which makes it possible to suppress a clearance flow and to improve the turbine efficiency. Particularly in the small opening-degree range, suppression of a clearance flow in the entire flow loss has a strong effect to improve the turbine efficiency.

Furthermore, in the above described embodiment, the blade height of the variable nozzle 36 at the outlet side is greater than the blade height of the turbine blade 28 at the inlet side, which makes it possible to increase the throat area of the flow path "f" of the working fluid "w" formed between two adjacent variable nozzles 36. Thus, it is possible to ensure a sufficient flow rate (maximum flow rate) of the working fluid "w" that flows into the turbine blade 28 when the variable nozzle 36 is in the large opening-degree range.

Furthermore, the working fluid "w" is attracted toward the second wall surface 52 (hub side) due to the protruding portion 44, 54, and a drift toward the first wall surface 50 (the shroud) is suppressed. Thus, unevenness in the flow-velocity distribution in the radial direction (distribution of the flow velocity V in the radial direction) of the expansion turbine 10 (10A, 10B) is mitigated at the outlet of the turbine blade 28, which reduces a mixing loss. Accordingly, a high turbine efficiency can be maintained even if the variable nozzle 36 is in the small opening-degree range.

In this way, it is possible to improve the turbine efficiency at the time when the variable nozzle 36 is in the small opening-degree range regardless of the shape of the scroll section, and thus, it is possible to ensure a flow rate (maximum flow rate) of the working fluid "w" that flows into the turbine blade 28 when the variable nozzle 36 is in the large opening-degree range.

Figure 5:
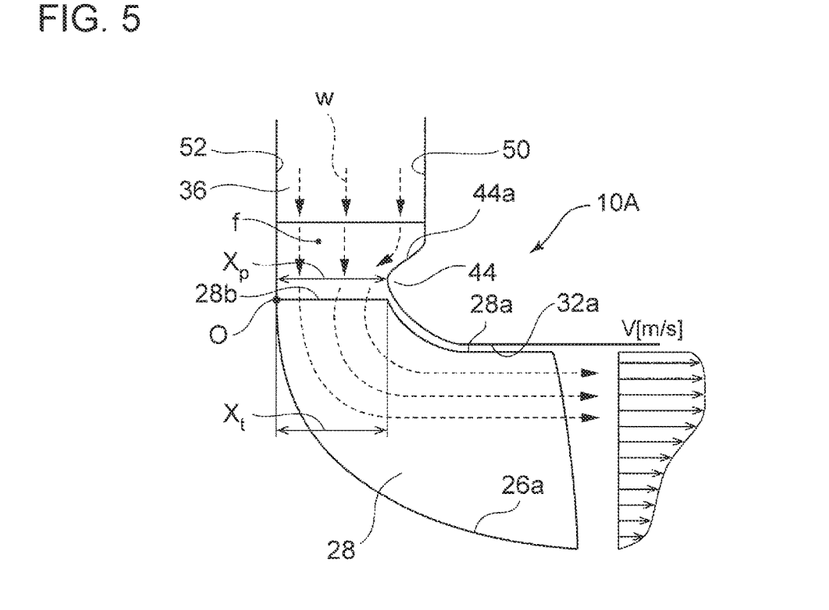
FIG. 5 is an explanatory diagram for describing a flow of a working fluid in an expansion turbine according to an embodiment.
Figure 6:
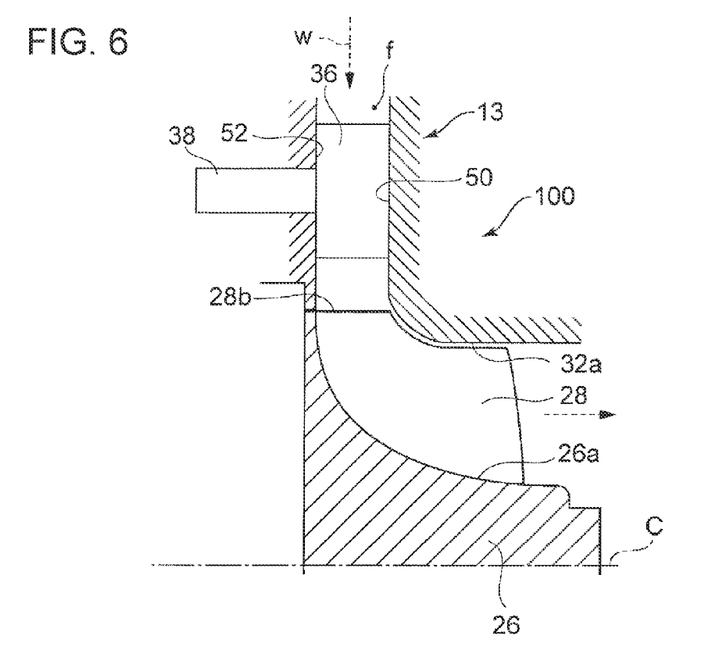
FIG. 6 is a partially-enlarged cross-sectional view of a typical expansion turbine.
Figure 7:
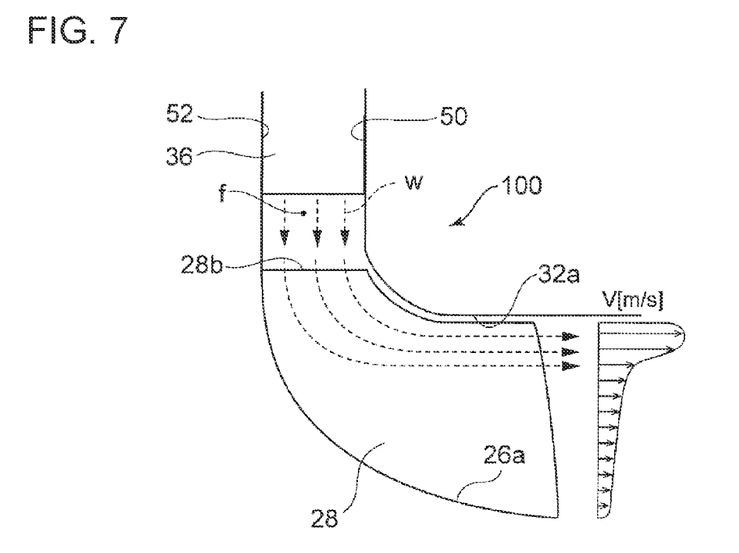
FIG. 7 is an explanatory diagram for describing a flow of a working fluid in an expansion turbine depicted in FIG. 6.

FIGS. 6 and 7 are views of a typical expansion turbine, corresponding to FIGS. 3 and 5 showing the present embodiment. Generally, the working fluid "w" flows into the turbine blade 28 while having a strong swirling component when the variable nozzle 36 is in the small-opening region, but has a small flow-velocity component in the radial direction.

In the typical expansion turbine 100, the blade height of the variable nozzle 36 at the outlet side is substantially the same as the blade height of the turbine blade 28 at the inlet side, and the tapered surface 44a (54a) and the protruding portion 44 (54) are not formed. Thus, as depicted in FIG. 7, in the small opening-degree range of the variable nozzle 36, the working fluid "w" is likely to be attracted toward the first wall surface 50 including the wall surface of the shroud wall 32a, due to a centrifugal force generated by a swirling component of the working fluid "w" flowing into the turbine blade 28.

Accordingly, if the working fluid "w" is attracted toward the first wall surface 50, the flow of the working fluid "w" gets closer to the side of the first wall surface 50, thus the flow velocity V being higher by the side of the first wall surface 50 and lower by the side of the second wall surface 52, at the outlet of the turbine blade 28. As a result, the working fluid "w" spreads out at the downstream side of the turbine blade 28 so as to cancel unevenness in the flow velocity, which is likely to cause a mixing loss.

While the present invention is applied to a radial turbine in the above described embodiment, application of the present invention is not limited to a radial turbine, and may be a mixed-flow turbine and a turbocharger including the mixed-flow turbine, for instance.

INDUSTRIAL APPLICABILITY

According to at least one aspect of the present invention, it is possible to provide an expansion turbine whereby it is possible to suppress a decrease in the turbine efficiency when the variable nozzles are in the small opening-degree range, to ensure a flow rate of a working fluid when the variable nozzles are in the large opening-degree range, and to reduce a decrease in the performance of the turbine blade to suppress a decrease in the turbine efficiency.

DESCRIPTION OF REFERENCE NUMERALS

1 Turbocharger
1a Exhaust turbine
1b Bearing mount
1c Compressor
2a, 13 Turbine housing
12 Outer shell portion
2d Inlet casing
2e, 42 Outlet opening
2b Bearing housing
2c Compressor
2f Inlet opening
2g Outlet casing
3 Center shaft
4 Turbine wheel
5 Compressor wheel
6 Automobile engine
6a Exhaust port
6b Intake port
7 Exhaust pipe
8 Intake pipe
9 Inter-cooler
10A, 10B, 100 Expansion turbine
16 Coupling unit
20 Bearing
22 Lubricant oil passage
26 Hub
26a Hub surface
28 Turbine blade
28a Tip
28b Leading edge
30 Scroll section
32 Nozzle plate
32a Shroud wall
34 Nozzle mount 36 Variable nozzle
38 Rotation shaft
40 Synchronization mechanism
42 Outlet opening
44, 54 Protruding portion
44a, 54a Tapered surface
50 First wall surface
52 Second wall surface
C Axis
a Air
e Exhaust gas
f Flow path
h Expansion allowance
r Lubricant oil
s Space
w Working fluid

The invention claimed is:

1. An expansion turbine for recovering power from energy of a working fluid, comprising;
   a turbine housing including a scroll section for taking in the working fluid;
   a plurality of variable nozzles disposed inside the turbine housing at intervals in a circumferential direction of the expansion turbine, each of the variable nozzles being configured to be rotatable about a rotation shaft so as to change an area of a flow path of the working fluid flowing from the scroll section; and
   a turbine wheel disposed rotatably inside the turbine housing, the turbine wheel including a plurality of turbine blades disposed downstream of the variable nozzles,
   wherein the turbine housing includes an outer shell defining a profile of the turbine housing, a nozzle plate, and a nozzle mount disposed so as to face the nozzle plate,
   wherein the nozzle plate has a first wall surface including a shroud section which faces tips of the turbine blades, and the nozzle mount has a second wall surface which faces the first wall surface across the flow path of the working fluid,
   wherein a blade height of the variable nozzles at an outlet side is greater than a blade height of the turbine blades at an inlet side,
   wherein the shroud section has a protruding portion protruding toward the second wall surface so as to reduce a height of the flow path of the working fluid toward downstream, at a downstream side of an outlet of the variable nozzles and an upstream side of an inlet of the turbine blades,
   wherein the second wall surface of the nozzle mount is formed in a flat shape from the outlet of the variable nozzles to an upstream side of an inlet of the variable nozzles,
   wherein a protruding amount of the protruding portion is set so that a tip end of the protruding portion does not protrude toward the second wall surface past the tips of the turbine blades at the inlet,
   wherein the expansion turbine comprises a radial turbine configured such that the working fluid flows into the inlet of the turbine blades along a radial direction of the expansion turbine, and
   wherein, where an origin is an axial position of roots of the turbine blades at the inlet and $X_t$ is an axial length between the tips of the turbine blades at the inlet of the turbine blades and the origin and $X_p$ is an axial length between the tip end of the protruding portion and the origin, where $X_t$ and $X_p$ satisfies a relationship $0<X_t<X_p$.

2. The expansion turbine according to claim 1,
   wherein the first wall surface has a tapered surface extending diagonally with respect to the radial direction and forming the protruding portion, and
   wherein an angle formed between the tapered surface and an axial direction of the expansion turbine is not greater than 40 degrees.

3. The expansion turbine according to claim 1,
   wherein a relationship $R_S/R_R>1.4$ is satisfied, where $R_S$ is a distance in the radial direction between a center axis of the expansion turbine and the rotation shaft of the variable nozzle, and $R_R$ is a distance in the radial direction between the center axis of the expansion turbine and the inlet of the turbine blades.

4. The expansion turbine according to claim 1,
   wherein the first wall surface of the nozzle plate is formed in a flat shape from the outlet of the variable nozzles to the upstream side of the inlet of the variable nozzles.

5. The expansion turbine according to claim 1,
   wherein the first wall surface of the nozzle plate is formed to have a linear shape from the protruding portion of the shroud section to an upstream end of the first wall surface, in a cross section taken along an axis of the expansion turbine.

6. The expansion turbine according to claim 1,
   wherein the shroud section has an expansion allowance upstream of the protruding portion, between the protruding portion and an outlet of the variable nozzles in a position of a maximum opening degree, so as to allow thermal expansion of the variable nozzles.

7. The expansion turbine according to claim 1,
   wherein a hub surface of a hub of the turbine wheel extends to a position of leading edges of the turbine blades.

8. A turbocharger comprising:
   the expansion turbine according to claim 1, configured to be driven by exhaust gas from an internal combustion engine; and
   a compressor configured to be driven by the expansion turbine to compress intake air to the internal combustion engine.

* * * * *